(12) United States Patent
Howell et al.

(10) Patent No.: US 10,218,688 B2
(45) Date of Patent: *Feb. 26, 2019

(54) CREATING AWARENESS OF ACCESSED TO PRIVACY-SENSITIVE DEVICES

(71) Applicant: Microsoft Technology Licensing, LLC, Redmond, WA (US)

(72) Inventors: Jonathan R. Howell, Seattle, WA (US); Stuart Schechter, Kirkland, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 460 days.

This patent is subject to a terminal disclaimer.

(21) Appl. No.: 14/703,861

(22) Filed: May 4, 2015

(65) Prior Publication Data

US 2015/0237033 A1 Aug. 20, 2015

Related U.S. Application Data

(63) Continuation of application No. 12/640,396, filed on Dec. 17, 2009, now Pat. No. 9,026,952.

(51) Int. Cl.
*G06F 21/00* (2013.01)
*H04L 29/06* (2006.01)
(Continued)

(52) U.S. Cl.
CPC .......... *H04L 63/08* (2013.01); *G06F 3/04812* (2013.01); *G06F 3/04817* (2013.01);
(Continued)

(58) Field of Classification Search
CPC .............. G06F 21/6245; G06F 11/324; G06F 17/30749; G06F 21/60; G06F 21/00;
(Continued)

(56) References Cited

U.S. PATENT DOCUMENTS 6,324,646 B1 11/2001 Chen et al.
6,714,778 B2 3/2004 Nykanen et al.
(Continued)

OTHER PUBLICATIONS

Boyer et al., "FriendGlass: A privacy preserving ambient location display," retrieved on Oct. 6, 2009 at <<http://www.verbicidal.org/hcisec-workshop/papers/boyer.pdf>>, pp. 1-4.
(Continued)

*Primary Examiner* — Shen Shiau
(74) *Attorney, Agent, or Firm* — Drinker Biddle & Reath LLP

(57) ABSTRACT

Techniques for providing intuitive feedback to a user regarding which applications have access to a data stream captured by a privacy-sensitive device, such as a camera, a microphone, a location sensor, an accelerometer or the like. These techniques apprise the user of when an application is receiving potentially privacy-sensitive data and the identity of the application receiving the data. In some instances, this feedback comprises a graphical icon that visually represents the data stream being received and that dynamically alters with the received data stream. For instance, if an application receives a data stream from a camera of a computing device of the user, the described techniques may display an image of the video feed captured by the camera and being received by the application. This graphical icon intuitively alerts the user of the data stream that the application receives.

20 Claims, 9 Drawing Sheets

(51) Int. Cl.
*H04L 12/26* (2006.01)
*G06F 3/0481* (2013.01)
*G06F 21/62* (2013.01)
*G06F 21/36* (2013.01)
*G06F 21/60* (2013.01)
*G06F 17/30* (2006.01)
*G06F 11/32* (2006.01)
*H04L 12/18* (2006.01)

(52) U.S. Cl.
CPC .......... *G06F 21/00* (2013.01); *H04L 43/0811* (2013.01); *G06F 11/324* (2013.01); *G06F 17/30749* (2013.01); *G06F 21/36* (2013.01); *G06F 21/60* (2013.01); *G06F 21/6245* (2013.01); *G06F 2221/2111* (2013.01); *H04L 12/1895* (2013.01)

(58) Field of Classification Search
CPC .............. G06F 21/36; G06F 2221/2111; Y10S 715/977; H04L 12/1895
See application file for complete search history.

(56) References Cited

U.S. PATENT DOCUMENTS

| | | | |
|---|---|---|---|
| 7,523,397 B2 | 4/2009 | Cheung et al. | |
| 8,166,557 B1 | 4/2012 | Shapiro | |
| 8,413,167 B2* | 4/2013 | Biggs | G06F 21/554 719/318 |
| 9,026,952 B2* | 5/2015 | Howell | G06F 21/6245 715/741 |
| 2002/0055997 A1 | 5/2002 | Pinnell | |
| 2002/0099944 A1* | 7/2002 | Bowlin | G06F 21/6218 713/185 |
| 2002/0173295 A1* | 11/2002 | Nykanen | H04L 63/10 455/414.1 |
| 2004/0103167 A1* | 5/2004 | Grooters | G06F 9/546 709/217 |
| 2005/0257204 A1* | 11/2005 | Bryant | G06F 3/0481 717/163 |
| 2006/0221190 A1 | 10/2006 | Limberis et al. | |
| 2008/0180743 A1* | 7/2008 | Uruta | G06F 3/1207 358/1.15 |
| 2008/0240578 A1 | 10/2008 | Gudmundson et al. | |
| 2009/0083847 A1 | 3/2009 | Fadell et al. | |
| 2009/0089803 A1* | 4/2009 | Biggs | G06F 21/554 719/318 |
| 2010/0017746 A1* | 1/2010 | Husoy | G06F 3/0484 715/781 |
| 2010/0251340 A1* | 9/2010 | Martin | G06F 9/541 726/4 |
| 2011/0030067 A1* | 2/2011 | Wilson | G06F 21/6245 726/27 |
| 2011/0141276 A1 | 6/2011 | Borghei | |
| 2012/0222083 A1* | 8/2012 | Vaha-Sipila | H04L 63/102 726/1 |
| 2014/0123208 A1* | 5/2014 | Plagemann | G06F 21/629 726/1 |

OTHER PUBLICATIONS

Cranor et al., "User Interfaces for Privacy Agents," ACM Transactions on Computer-Human Interaction, vol. 13, No. 2, Jun. 2006, pp. 135-178.

Jeloka et al., "Oracle Label Security Administrator's Guide 11g Release 1 (11.1)," retrieved on Oct. 6, 2009 at <<http://download.oracle.com/docs/cd/B28359_01/network.111/b28529/labels.htm>>, Jul. 2007, 294 pages.

Margolin et al., "Guardian: A Framework for Privacy Control in Untrusted Environments," retrieved on Oct. 6, 2009 at <<http://prisms.cs.umass.edu/brian/pubs/margolin.wright.guardian.pdf>>, pp. 1-16.

Office action for U.S. Appl. No. 12/640,396, dated Jan. 27, 2014, Howell et al., "Creating Awareness of Accesses to Privacy-Sensitive Devices," 13 pages.

Office action for U.S. Appl. No. 12/640,396, dated Nov. 9, 2012, Howell et al., "Creating Awareness of Accesses to Privacy-Sensitive Devices," 23 pages.

Non-Final Office Action for U.S. Appl. No. 12/640,396, dated Apr. 25, 2012, Jonathan R. Howell et al., "Creating Awareness of Accesses to Privacy-Sensitive Devices," pp. 1-16.

Final Office Action for U.S. Appl. No. 12/640,396, dated Aug. 27, 2014, Jonathan R. Howell, "Creating Awareness of Accesses to Privacy-Sensitive Devices," 17 pages.

"Standard Administrative Procedure—Data Classification and Protection," retrieved on Oct. 6, 2009 at <<http://rules-saps.tamu.edu/PDFs/29.01.99.M1.29.pdf>>, Jun. 15, 2009, 4 pages.

Ten Hoedt, "Context-Aware Mobile Health Applications," retrieved on Oct. 6, 2009 at <<http://referaat.cs.utwente.nl/documents/2006_04_B-Context_aware_Services_and_Applications/2006_04_B_Hoedt,%20A.B.M.-Context-Aware_Mobile_Health_Applications.pdf>>, 4th Twente Student Conference on IT, 2006, 4 pages.

Williams et al., "Distributed Smart Cameras for Aging in Place," retrieved on Oct. 6, 2009 at <<http://www.dtic.mil/cgi-bin/GetTRDoc?AD=ADA459913&Location=U2&doc=GetTRDoc.pdf>>, 6 pages.

Yip et al., "Privacy-Preserving Browser-Side Scripting with BFlow," retrieved on Oct. 6, 2009 at <<http://pdos.csail.mit.edu/papers/bflow:eurosys09.pdf>>, EuroSys 2009, ACM, 2009, 14 pages.

* cited by examiner

CREATING AWARENESS OF ACCESSED TO PRIVACY-SENSITIVE DEVICES

RELATED APPLICATIONS

This application is a continuation of U.S. application Ser. No. 12/640,396, filed on Dec. 17, 2009, which is incorporated by reference herein in its entirety.

BACKGROUND

In a desktop application model, a user installing an application makes a once-and-for-all trust decision at "install time" to trust an application in its entirety. This decision is typically based on provenance of the application or a recommendation for the application. Once installed, the desktop application has the ability to see essentially any private data the user has stored, to interfere with other applications (sometimes desirably) and to capture privacy-sensitive input from a microphone, camera, location sensor or the like.

One attractive feature of a web application model, meanwhile, is that this model replaces the desktop-application trust model with a much more modest trust model. Here, each web application is isolated according to the web site that hosts the respective application, and the site name serves as a security principal. The application is isolated from other applications and from the user's stored files via a safe language mechanism (such as Java or JavaScript) or via an isolated binary container. This model eliminates the need for the user to approve each application. Instead, the user visits a site, uses an application and, when finished, the user closes the window. At this point, the application is gone from the perspective of the user's computing device, and the application has not been given access to the user's private information through the file system or other applications.

Some web applications, however, require legitimate access to privacy-sensitive input devices. A video conferencing application, for instance, reads the webcam and microphone of the user's computing device. A friends-proximity application reads the location of the computing device from the location sensor, such as a global positioning system (GPS). Because of this, the user typically determines which applications (or vendors, expressed as domains) to trust with the privacy-sensitive stream, such as the video feed, the location information or the like.

Two naïve models present themselves. Per-session authorization allows an application access to a device until the application window is closed. Repeated uses of the application result in potentially numbing dialog boxes, training the user to click "OK" without thinking, eventually eliminating any intelligent authorization decision-making by the user.

Alternatively, trust can be associated with the principal (e.g., with a web site domain) that supplies the application. Here, future instances of the same application, and even revisions of the application, work without explicit reauthorization. In this world, the access control list that enumerates the "trusted principals" is buried in the browser of the user's computing device. Few users will ever locate or see this list of accepted domains, memorize the list of domains, and understand how those domains map (via the address bar) to the actual applications the users run. As such, this model also presents a security risk in the form of nearly unlimited trust being given to a principal (e.g., a web site domain) to whom the user should in fact not provide such open-ended trust.

SUMMARY

This document describes techniques for providing intuitive feedback to a user regarding which applications have access to a data stream captured by a privacy-sensitive device, such as a camera, a microphone, a location sensor, an accelerometer or the like. As such, these techniques apprise the user of when an application is receiving potentially privacy-sensitive data and the identity of the application receiving the data. With this information, the user can then intelligently decide whether to allow such access to continue, or whether to revoke this access.

In some instances, the provided feedback comprises a graphical icon that visually represents the data stream being receiving and that dynamically alters with the received data stream. For instance, if an application receives a data stream captured by a camera of a computing device of the user, the described techniques may display an image of the video feed being captured by the camera and being received by the application. This graphical icon intuitively alerts the user of the data stream that the application receives and allows the user to decide whether or not to allow such access to continue.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

Figure 1:
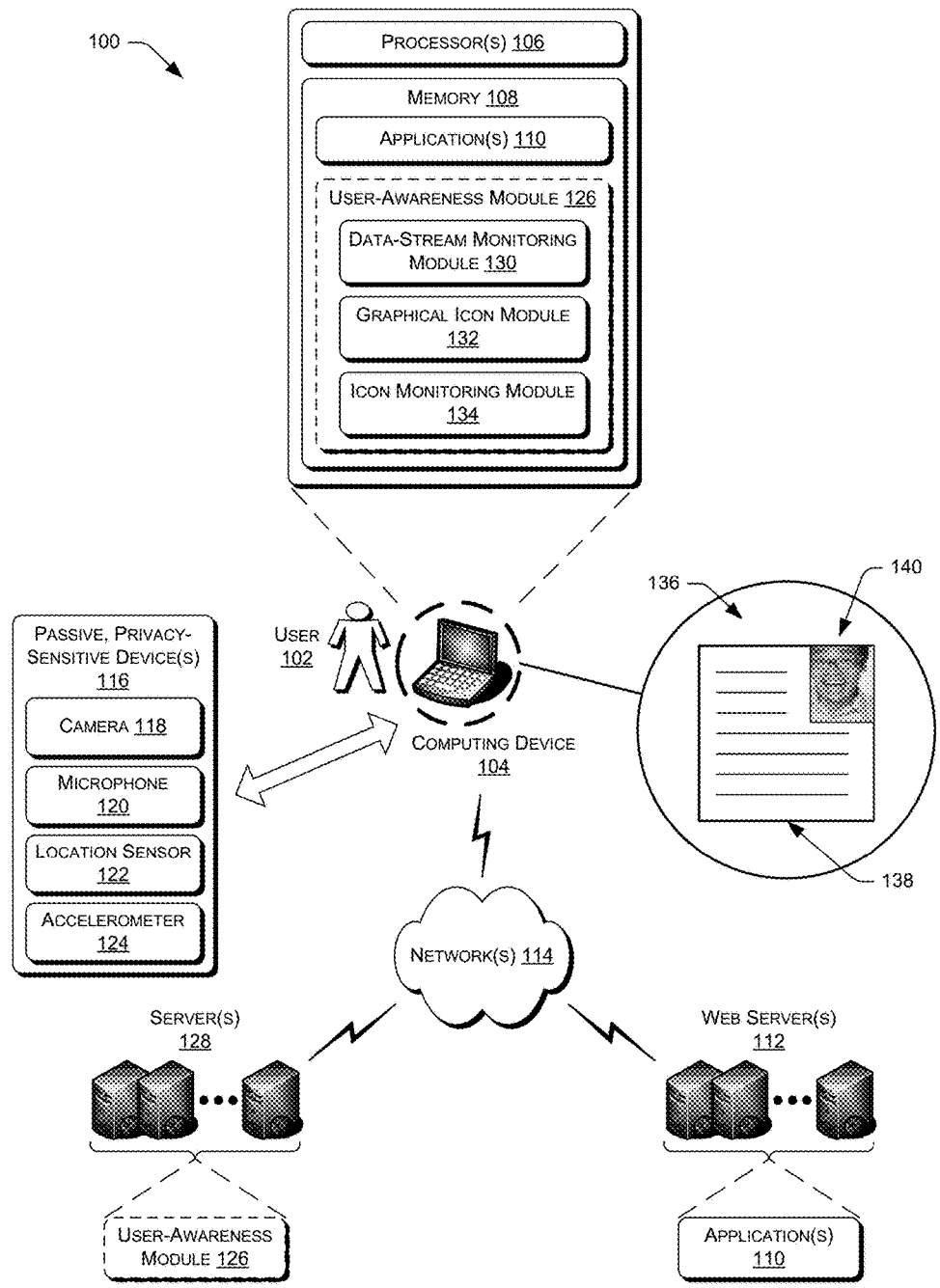
FIG. 1 illustrates an example computing architecture in which a user operating a computing device runs an application that is receiving a data stream being captured by a passive, privacy-sensitive device of the computing device. In response, a user-awareness module presents a graphical icon within or adjacent to the application and representing the data stream that the application receives.

The disclosure describes techniques for apprising a user of when an application is receiving or requesting to receive a data stream captured by a passive, privacy-sensitive device. These techniques also apprise the user of the identity of the application, thereby enabling the user to determine whether or not to allow such access to occur. These techniques may apply to web applications, desktop applications, or any other type of applications.

To apprise the user in this manner, the techniques described below provide intuitive feedback that visually represents precisely which data stream is being received and by whom. This visual feedback represents the underlying data that the application receives in a manner that is temporally correlated to this data. In some instances, the visual feedback actually mirrors the underlying data that the application receives.

For instance, if an application receives a data stream from a camera of a computing device of the user, the described techniques may display an image of the video feed being captured by the camera and being received by the application. This graphical icon intuitively alerts the user that a particular identified application is receiving the video feed of the user sitting in front of his or her computer. The user will likely find this image hard to ignore and, as such, will very likely make a decision regarding whether or not to allow the application to continue receiving the data. These techniques enable such decisions without presenting repetitive and potentially aggravating dialog boxes to the user.

In instances where the application comprises a video conferencing application or the like, the user will likely be unsurprised to learn that the application is receiving the video stream and, as such, will likely allow the application to continue to receive the stream. If, however, the user sees this icon while reading an online newspaper, for instance, then the user will likely be surprised to see that the application is receiving of the video feed of the user reading the morning news. As such, the user may choose to deny the application access to the camera.

The discussion begins with a section entitled "Example Computing Architecture," which describes one non-limiting environment that may implement the described techniques. A section entitled "Example User Interfaces" follows, and illustrates and describes example user interfaces that may be used to apprise users in the manner described immediately. A third section, entitled "General Operation," illustrates and describes an example process for making a user aware of when an application receives or requests to receive a data stream captured by a passive, privacy-sensitive device of a computing device of the user. Finally, the discussion ends with a brief conclusion.

This brief introduction, including section titles and corresponding summaries, is provided for the reader's convenience and is not intended to limit the scope of the claims, nor the proceeding sections.

Example Computing Architecture

FIG. 1 illustrates an example computer architecture 100 that may implement the described techniques for apprising a user of when an application is receiving or requesting to receive a data stream captured by a passive, privacy-sensitive device of a computing of the user. The architecture 100 includes a user 102 operating a computing device 104 comprising one or more processors 106 and memory 108 to execute an application 110. The application 110 may comprise any sort of application, such as a video conferencing or video chat application, a game, a word processing application or any other type of similar or different application.

In some instances, the application 110 comprises a web-based application. Here, one or more web servers 112 having processing and storage capability store the application 110, which the user 102 accesses and runs over a network 114. In instances where the user 102 runs a web-based application, the application 110 runs within a browser or other client application stored on the memory 108 of the computing device 104.

The network 114 over which the user 102 may access the web-based application 110 is representative of any one or combination of multiple different types of networks, interconnected with each other and functioning as a single large network (e.g., the Internet or an intranet). The network 114 may include wire-based networks (e.g., cable) and wireless networks (e.g., cellular, satellite, etc.). The network 114 may use any number of protocols and configurations to enable the computing device 104 to access other devices and resources, such as the web servers 112.

FIG. 1 further illustrates that the computing device 104 includes or otherwise has access to one or more passive, privacy-sensitive devices 116. Generally, the passive, privacy-sensitive devices 116 include devices that passively capture data streams that are considered privacy-sensitive from the perspective of the user. That is, these devices 116 capture their respective data streams without active input provided by the user, such as typing on a keyboard or moving a mouse. For instance, passive, privacy-sensitive devices 116 may reveal information about the user's whereabouts (if the device is a location sensor), a user's words (if the device is a microphone), the user's appearance (if the device is a camera), or mode of transport (if the device is an accelerometer). These devices may reveal some or all of this data without direct input from the user and without any of the feedback that is integral to active input devices.

This is in contrast to active input devices such as keyboards, mice, and remote controls, with which the user must actively engage in order to provide input. Whereas active input devices usually require immediate feedback to the user to be usable (showing mouse movements, letters on the screen, etc.), passive input may be accessed reliably without a feedback loop with the user. As such, the techniques described herein propose an access control mechanism for passive, privacy-sensitive devices that ensures that users are aware when these devices are in use by associating each device with a visual feedback mechanism or indicator.

FIG. 1 illustrates that the passive, privacy-sensitive devices 116 include a camera 118 (e.g., a web cam), a microphone 120, a location sensor 122 and an accelerometer 124. These devices may be integral with the computing device 104 and/or may removably couple to the computing device 104. In either event, each of these devices 116 captures a data stream that may be deemed privacy-sensitive by the user 102. For instance, the camera 118 captures video of the environment surrounding the computing device 104. In instances where the user 102 operates the computing device 104, this video feed captures the actions of the user 102. The microphone 120, meanwhile, captures an audio of the environment surrounding the computing device 104. Again, in instances where the user 102 operates the computing device 104, this audio feed captures the actions of the user 102.

The location sensor 122 may comprise a global positioning system (GPS) or other sensor that is capable of determining a location of the computing device 104 and, hence, potentially of the user 102. Finally, the accelerometer 124 captures a data stream comprising movement and/or orientation of the computing device 104. With this information, an entity could deduce potentially privacy-sensitive information regarding the computing device 104 and, hence, the user 102. For instance, if the information from the accelerometer 124 indicates that the computing device is subject to frequent movement and/or orientation changes, then the entity could deduce that the user 102 is travelling in a vehicle. In another example, an entity could compare data streams from accelerometers of multiple different computing devices to determine whether or not the respective computing devices share similar motions and, hence, are proximate to one another (e.g., travelling in the same vehicle).

While a few examples of the passive, privacy-sensitive devices 116 have been discussed, other implementations may include any other similar or different devices that passively capture potentially privacy-sensitive data streams. For instance, computing device 104 may include or have access to a thermometer, a Geiger counter, or any other passive, privacy-sensitive device.

In some instances, an application 110 (hosted on the device 104 or the web servers 112) requests access to one or more data streams captured by the privacy-sensitive devices 116. While the user 102 may expect certain applications to have such access to the data streams of certain devices at certain times, the user 102 may not have such expectations for certain other applications or at certain other times. For instance, the user 102 may expect a video conferencing application to have access to a data stream of the camera 118 and the microphone 120 when the user 102 conducts a video conference, but may not expect this application to have such access when the user is simply browsing the web.

Therefore, FIG. 1 illustrates that the computing device 104 of the user 102 either stores or has access to a user-awareness module 126, which may reside locally on the computing device 104 or remotely on one or more trusted servers 128 that are accessible via the network 114. These trusted servers may comprise a terminal server, a trusted cloud infrastructure, or the like. The user-awareness module 126 functions to apprise the user (visually, audibly, etc.) of an application that accesses or requests to access a data stream from a passive, privacy-sensitive device. This module 126 may also indicate the identity of the application gaining or requesting to gain the access to the data stream. Furthermore, this module 126 may interrupt the receiving of the data stream by the application in instances where the user-awareness module 126 deduces that the user 102 is unable to receive the feedback apprising the user 102 of the situation, as described below.

In certain instances, the user-awareness module 126 prompts the user 102 to allow or deny access to a passive, privacy-sensitive device to an application that has never before had access (as in the naïve model described above). Then, if the user approves such access, the user-awareness module 126 may switch to the techniques described below, in which the module 126 provides intuitive, unobtrusive feedback regarding when applications than have previously been granted permission to a privacy-sensitive data stream are accessing or requesting to access the data stream.

In other instances, the module 126 may implement a "default-on model." Here, the appropriate icon appears whenever an application is receiving a privacy-sensitive stream, even if the user 102 has yet to positively grant access the requesting application. In still other instances, the module 126 may implement a "default-off model." Here, the module 126 apprises the users when an application requests to receive a data stream (via the icons described herein, a pop-menu, or otherwise), but does not grant this request absent the user's explicit instructions to do so.

In each of these instances, the user-awareness module 126 includes a data-stream monitoring module 130, a graphical icon module 132 and an icon monitoring module 134. The data-stream monitoring module 130 functions to monitor the application(s) 110 to detect when one or more of these applications access or request access to a data stream from one or more of the passive, privacy-sensitive devices 116. Monitoring the applications in this manner may include actively monitoring the actual applications, monitoring the passive, privacy-sensitive device to detect when the applications request access, or the like.

In response to detecting such an event, the data-stream monitoring module 130 informs the graphical icon module 132 of the event. In response, the graphical icon module 132 displays a graphical icon in association with a displayed window of the application, such as on or adjacent the displayed window of the application, that indicates that the application is either requesting to receive the data stream or is in fact receiving the data stream.

In some instances, the displayed graphical icon represents the actual data that the application is receiving. This graphical icon may additionally or alternatively be temporally correlated to the received data. For instance, the graphical icon may include animations that dynamically alter in unison with the data being captured by the respective passive, privacy-sensitive device and being received by the application.

To illustrate, envision that the application 110 currently receives a data stream from the camera 118. The graphical icon module 132 may display a thumbnail of the actual live video feed captured by the camera 118 and received by the application 110 on a trusted border of the application 110. Similarly, if the application 110 receives the data stream from the microphone 120, the module 132 may display a waveform graph, a Volume Units (VU) meter, an amplitude graph, or the like that dynamically alters with the volume of the sound from the surrounding environment (e.g., the audio spoken by the user 102, etc.). When the application 110 captures a data stream from the location sensor 122, the module 132 may display an icon comprising a live GPS map overlay that includes an indication of the user's current location. Furthermore, when the application 110 receives the data stream from the accelerometer 124, the module 132 may display an icon illustrating the device changing its position or orientation in real time.

Finally, when the application 110 receives a data stream from other passive, privacy-sensitive devices (e.g., a thermometer, a Geiger counter, etc.), the graphical icon module 132 may display a graphical icon appropriate for those data streams. For instance, the module 132 may display a visual representation of a thermometer, a representation of a deflection needle type Geiger counter, and the like.

In each of these instances, the display icon will likely cause the user 102 to intuitively detect temporal correlations between the actions of the user and the icon. For instance, if the user 102 sees a thumbnail move whenever the user's head moves, the user 102 will likely understand that the corresponding application window has access to the camera 118. If the VU meter flicks when the user 102 speaks, then the user 102 will realize that the application 110 can "hear" the user's voice. Similarly, if the map shows her location or if the thumbnail of the user's computer moves with the computer, then the user 102 will likely know that the application 110 is "watching" her drive.

Furthermore, while the graphical icon module 132 displays the graphical icon, the icon monitoring module 134 monitors the graphical icon to determine whether the icon remains visible to the user 102. For instance, this module 134 monitors the displayed icon to determine whether another window obscures some or the entire displayed icon. In response to making such a determination, the module 134 may interrupt the receiving of the data stream by the application. Furthermore, the module 134 may provide this indication to the graphical icon module 132, which may alter the displayed graphical icon (or may display a new graphical icon) to indicate to the user 102 that the application is no longer receiving the data stream.

The icon monitoring module 134 then continues to monitor the graphical icon and, in response to determining that the icon is no longer obscured, may re-allow reception of the data stream by the application 110. This module 134 may also inform the graphical icon module 132, so that the graphical icon module 132 may display the graphical icon indicating to the user 102 that the application 110 is once more receiving the data stream.

To illustrate, FIG. 1 depicts an application window 136 comprising content 138 provided by the application 110 and a graphical icon 140 displayed by the user awareness module 126. Here, the application 110 is receiving the data stream from the camera 118. As such, the user-awareness module 126 displays the graphical icon 140 representing the data being received by the application 110 and being temporally correlated to the data. Here, the graphical icon 140 mirrors the actual data, in that the icon 140 comprises the video feed actually received by the application.

In some instances, the user-awareness module 126 enables the user 102 to block the application 110 from receiving the data stream from the passive, privacy-sensitive device, such as the camera 118. For instance, the graphical icon may be selectable such that when the user 102 selects the icon 140, the module 126 (or another application) displays a pop-up menu that allows the user to discontinue reception of the data stream by the application 110.

Having described one of many environments in which the described techniques may be implemented, the discussion proceeds to illustrate and describe several example graphical icons that may be implemented. It is to be appreciated, however, that these icons are merely examples of many different icons that the user-awareness module 126 may implement for the purpose of apprising the user 102 of accesses to passive, privacy-sensitive devices 116.

Example User Interfaces

Figure 2:
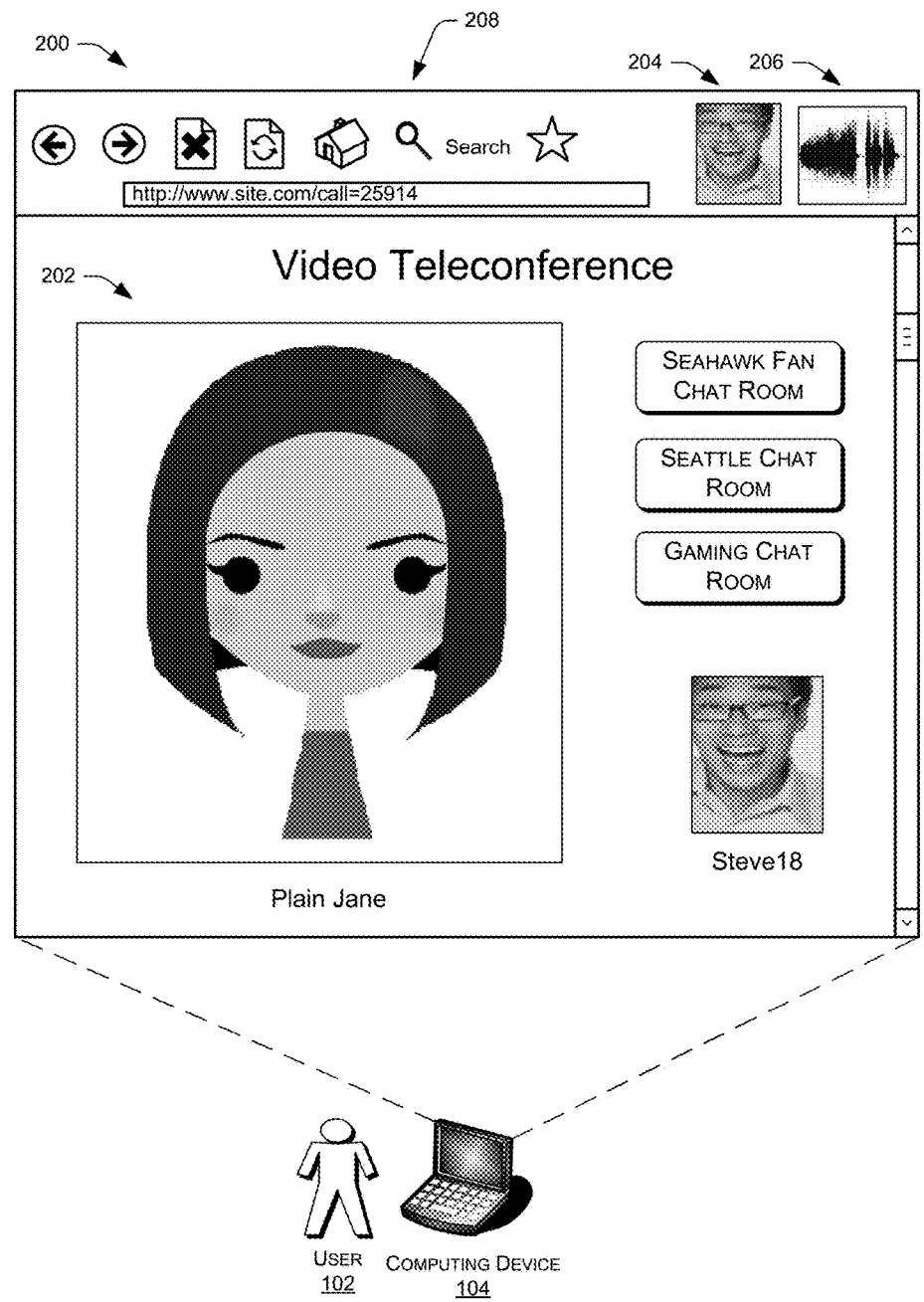
FIG. 2 is a user interface displayed by a video conferencing application running within a browser of the computing device of FIG. 1. Because the user is conducting a video conference, the application is receiving the data stream captured by the camera of the computing device, as well as the data stream captured by the microphone of the computing device. In addition and as illustrated, the user-awareness module displays respective graphical icons on a trusted border of the browser indicating to the user that the application is receiving the video feed from the camera and the audio feed from the microphone.

FIG. 2 is an example user interface displayed by a video conferencing application running within a window 200 of a browser of the computing device 104 of FIG. 1. Here, the window 200 of the application includes content 202 displayed by the application, as well as graphical icons 204 and 206 that the user-awareness module 126 of FIG. 1 displays. As illustrated, each of the graphical icons 204 visually represents a respective data stream that the application currently receives.

Because in this example the user 102 is conducting a video conference, the application currently receives the data stream captured by the camera 118 of the computing device 104, as well as the data stream captured by the microphone 120 of the computing device. As such, the user-awareness module 126 displays the graphical icon 204 indicating to the user 102 that the application is receiving the video feed from the camera 118. The user-awareness module 126 also displays the graphical icon 206 indicating to the user 102 that the application is receiving the audio feed from the microphone 120. While the module 126 may display these icons 204 and 206 in any location that indicates which application is receiving the data stream, the module 126 displays these icon on a trusted border 208 of the window 200 in this example.

In this example where the user 102 is currently conducting a video conference, the user 102 is likely not surprised to learn (from the graphical icons 204 and 206) that the application is receiving the video feed from the camera 118 and the audio feed from the microphone 120. As such, the user 102 is unlikely to proactively block the application from receiving either of these feeds.

Figure 3:
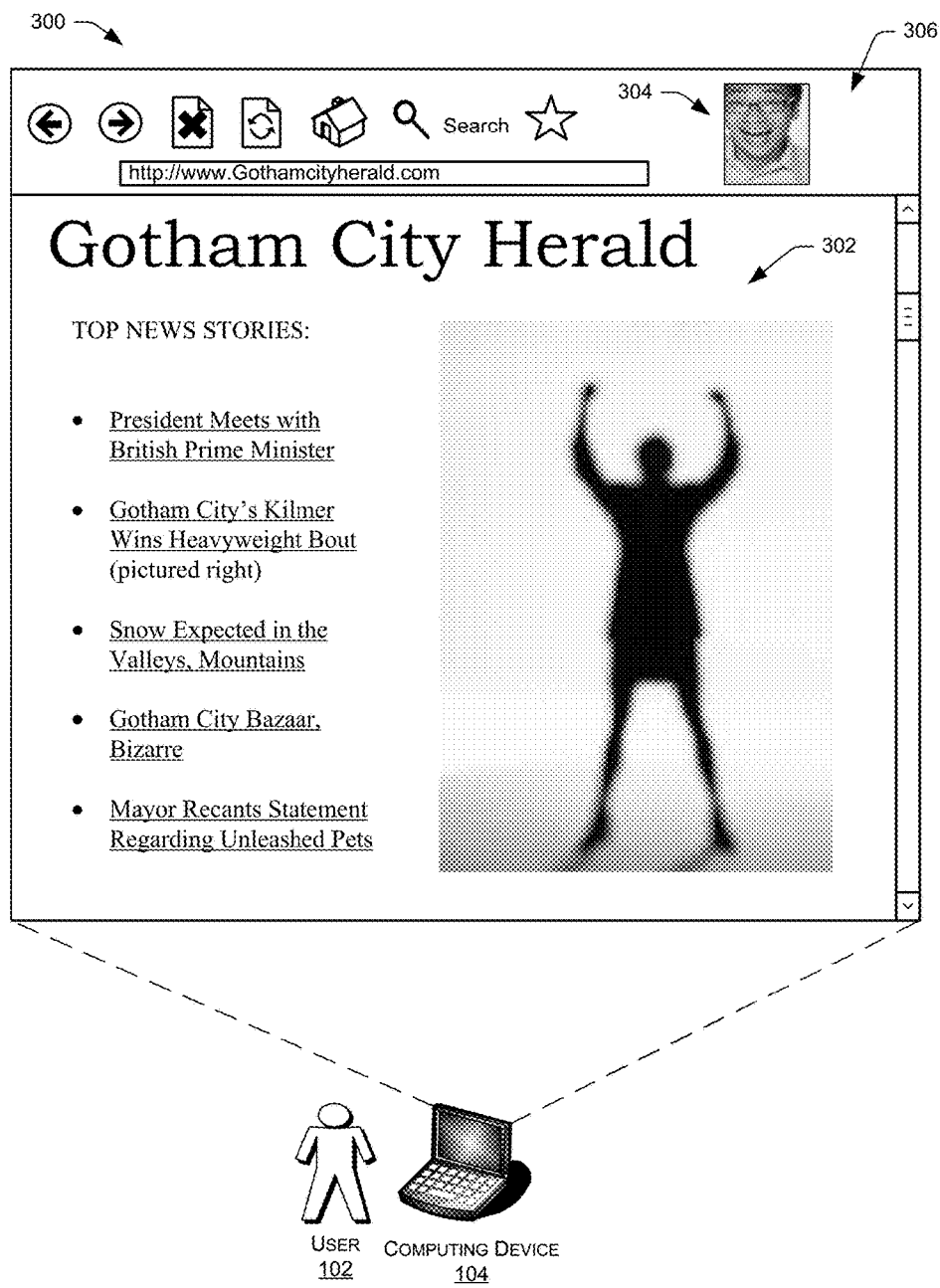
FIG. 3 illustrates a user interface of a web page being displayed by the browser of the computing device of FIG. 1. Here, an application also running within the browser is accessing the data stream captured by the camera of the computing device, as the graphical icon on the trusted border indicates. In contrast to FIG. 2, the user may be surprised to learn that an application is currently receiving the video feed in this instance.

FIG. 3, however, illustrates a different scenario. This figure illustrates a user interface of a web page being displayed by the browser of the computing device 104 of FIG. 1. Here, an application running within a window 300 displays content 302 within the window 300. Here, an example news web site displays the example content, which includes the news of a fictional city. In addition, the application displaying the content 302 within the window 300 currently accesses a data stream captured by the camera 118 of the computing device 104, as the graphical icon 304 on the trusted border 306 indicates.

In contrast to FIG. 2, the user 102 may be surprised to learn that an application is currently receiving the video feed, as the user 102 is simply reading an online newspaper at this moment. As such, the user is unlikely to expect the application displaying this content to also be receiving a live video feed of the user 102. As such, the user 102 may choose to select the graphical icon 304 that represents the live video feed for the purpose of denying the application further access to the privacy-sensitive data stream.

Figure 4:
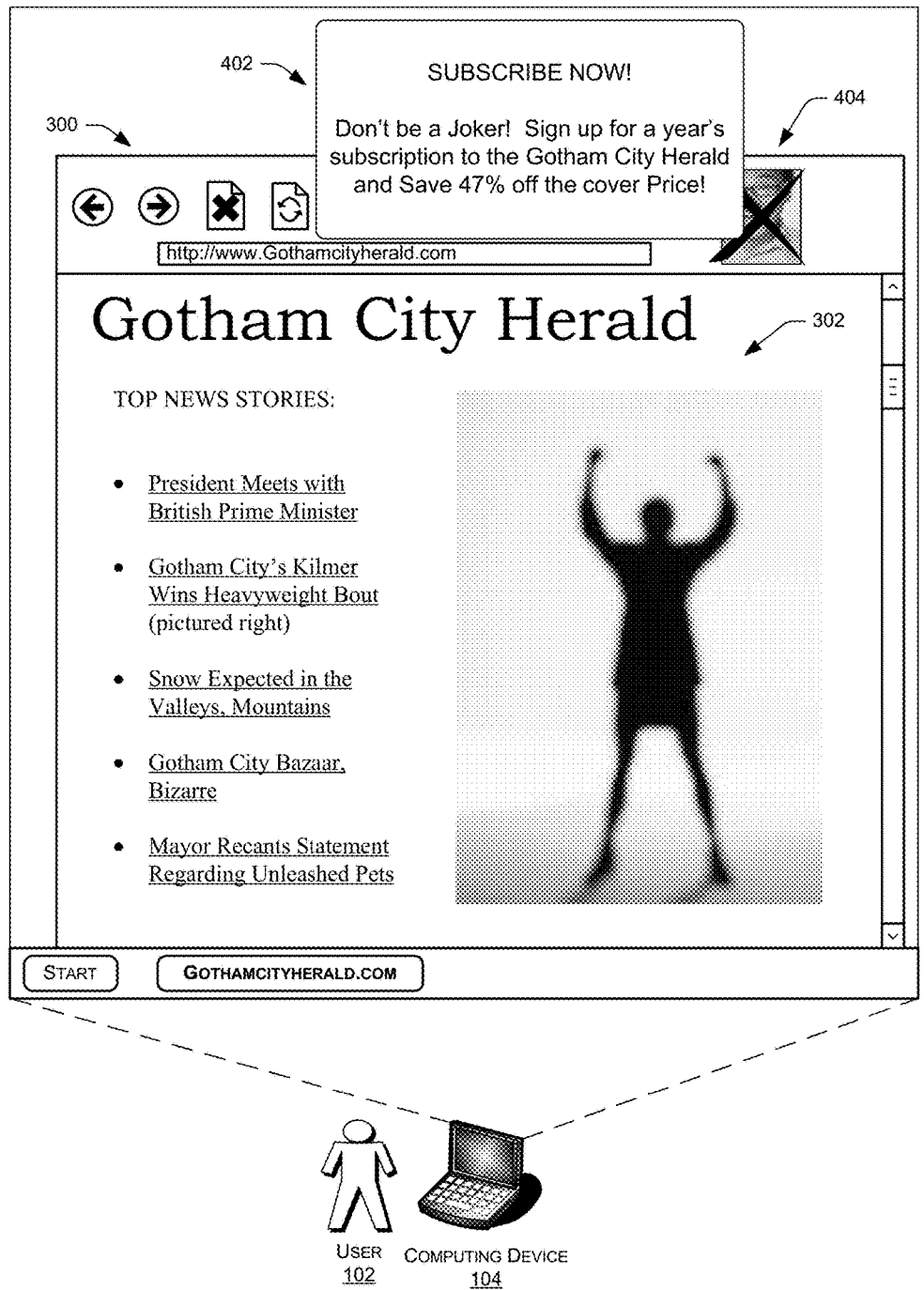
FIG. 4 illustrates the user interface from FIG. 3 after the graphical icon has been obscured and, hence, may not be completely visible to the user. As illustrated, the graphical icon now indicates that the application is no longer being allowed to receive the data stream from the camera.

FIG. 4, meanwhile, illustrates the user interface from FIG. 3 after the graphical icon from FIG. 3 has been obscured and, hence, may not be completely visible to the user 102. Here, another window 402 has partially obscured the graphical icon and, hence, the user-awareness module 126 has blocked the data stream that the application displaying the content 302 had been receiving. By doing so, the user-awareness module 126 ensures that the application is unable to hide in the background, receiving the video feed while the user 102 is unable to see the correlated motion cues apprising the user of the situation. Stated otherwise, this arrangement prevents a malicious application from generating its own pop-up content to hide the icon while the application surreptitiously acquires the video feed. Instead, the application is unable to receive the data stream unless the user 102 is able to see the icon indicating the application's consumption of this stream.

Furthermore, FIG. 4 illustrates that the user-awareness module 126 has either altered the graphical icon of FIG. 3 or has displayed a new graphical icon 404. In either instance, the graphical icon 404 indicates to the user 102 that the application no longer receives the data feed from the camera. Therefore, if the user 102 does indeed desire for the application to continue receiving the stream, the user 102 can either close or relocate the window 402.

While FIGS. 2-4 have illustrated techniques for handling instances where an application receives a data stream from the camera 118, similar techniques may apply when an application receives a data stream from another passive, privacy-sensitive device, such as the devices 116 described above.

Figure 5:
FIG. 5 illustrates another user interface of a web page being displayed by the browser. Here, an application running within the browser is accessing the data stream captured by the microphone of the computing device, as the graphical icon on the trusted border indicates.
Figure 5:
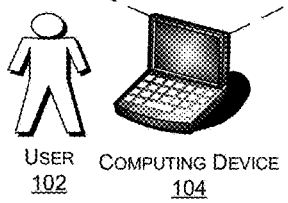

FIG. 5, for instance, illustrates an instance where an application running within the browser is accessing the data stream captured by the microphone 120 of the computing device 104. Here, the user-awareness module 126 displays a graphical icon 502 of a waveform that rises and falls with the audio captured from the environment of the computing device 104. For instance, the waveform dynamically alters as the user 102 or other users near to the computing device 104 speak. Again, the user 102 may interrupt this reception by, for instance, selecting the graphical icon 502 and requesting that the access to the microphone 120 be denied.

Figure 6:
FIG. 6 illustrates another user interface of a web page being displayed by the browser. Here, an application running within the browser is accessing the data stream captured by the location sensor of the computing device, as the graphical icon on the trusted border indicates.
Figure 6:
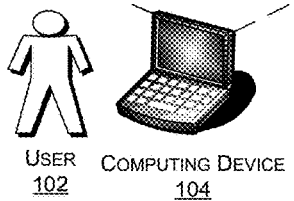

FIG. 6, meanwhile, illustrates an instance where an application running within the browser is accessing the data stream captured by the location sensor 122 of the computing device 104. Here, the user-awareness module 126 displays a graphical icon 602 of a map that indicates a current location (here, via a star) of the computing device 104 and, hence, potentially of the user 102. Furthermore, this map is updated as the location of the computing device 104 changes.

Figure 7:
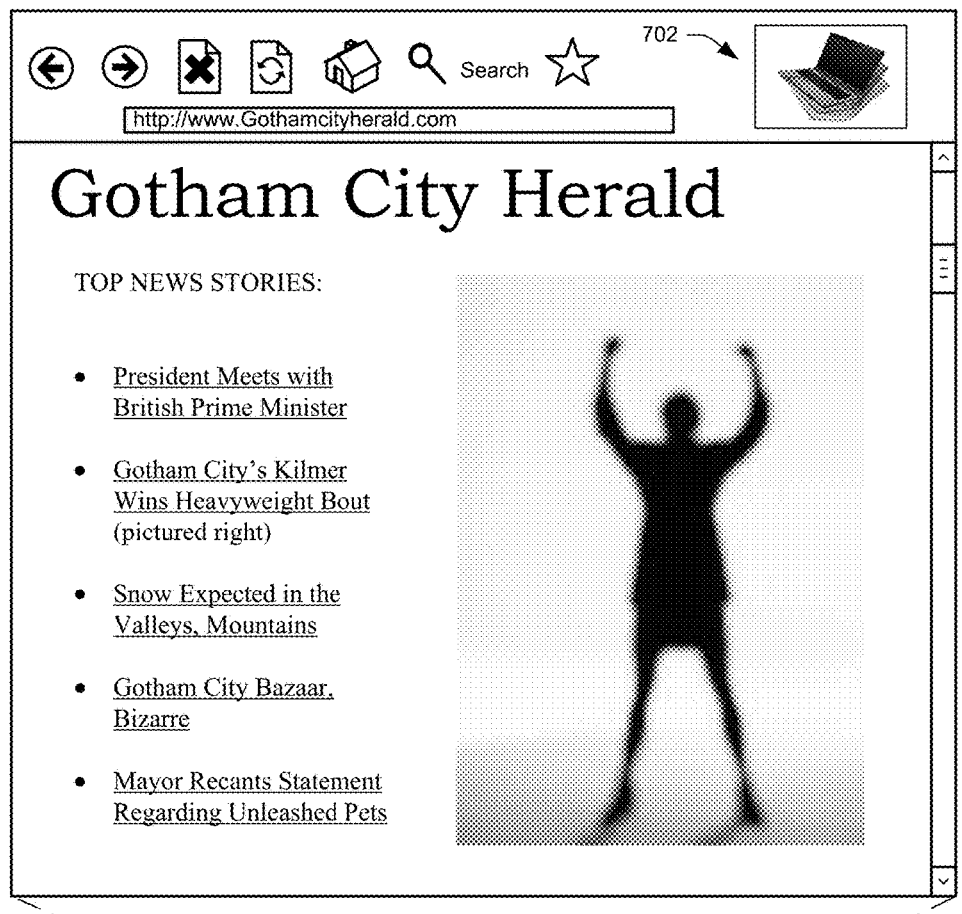
FIG. 7 illustrates another user interface of a web page being displayed by the browser. Here, an application running within the browser is accessing the data stream captured by the accelerometer of the computing device, as the graphical icon on the trusted border indicates.
Figure 7:
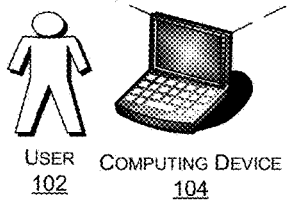

FIG. 7 next illustrates an instance where an application running within the browser is accessing the data stream captured by the accelerometer 124 of the computing device 104. Here, the user-awareness module 126 displays a graphical icon 702 of a computing device that is in motion. In some instances, the motioning of the computing device in the icon 702 mirrors the motion of the computing device 104 itself. For instance, the icon 702 may be a picture of the computing device 104 (e.g., the laptop) at an angle representing the device's current position relative to gravity (i.e., the ground) and that shows movement when movement is detected. In other instances, however, the icon 702 may simply move arbitrarily as the computing device 104 moves. In either event, the graphical icon 702 includes animations that represent the data that the application is receiving, as well as the identity of the application that is receiving the stream.

In addition to representing when an application is receiving a data stream captured by a passive, privacy-sensitive device, the user-awareness module 126 may also display a graphical icon indicating when the application is requesting to receive such access. In response to detecting this request, the user-awareness module 126 may block the request for a predetermined amount of time (e.g., ten second, ten minutes, etc.) while informing the user of the request. After expiration of this predetermined amount of time, the user-awareness module 126 may then allow the application access to the data stream if the user 102 did not object during that time. In other instances, meanwhile, the module 126 may disallow access to the data stream after the predetermined amount of time and may stop displaying the icon if the user 102 did not proactively allow such access during the predetermined amount of time.

Figure 8:
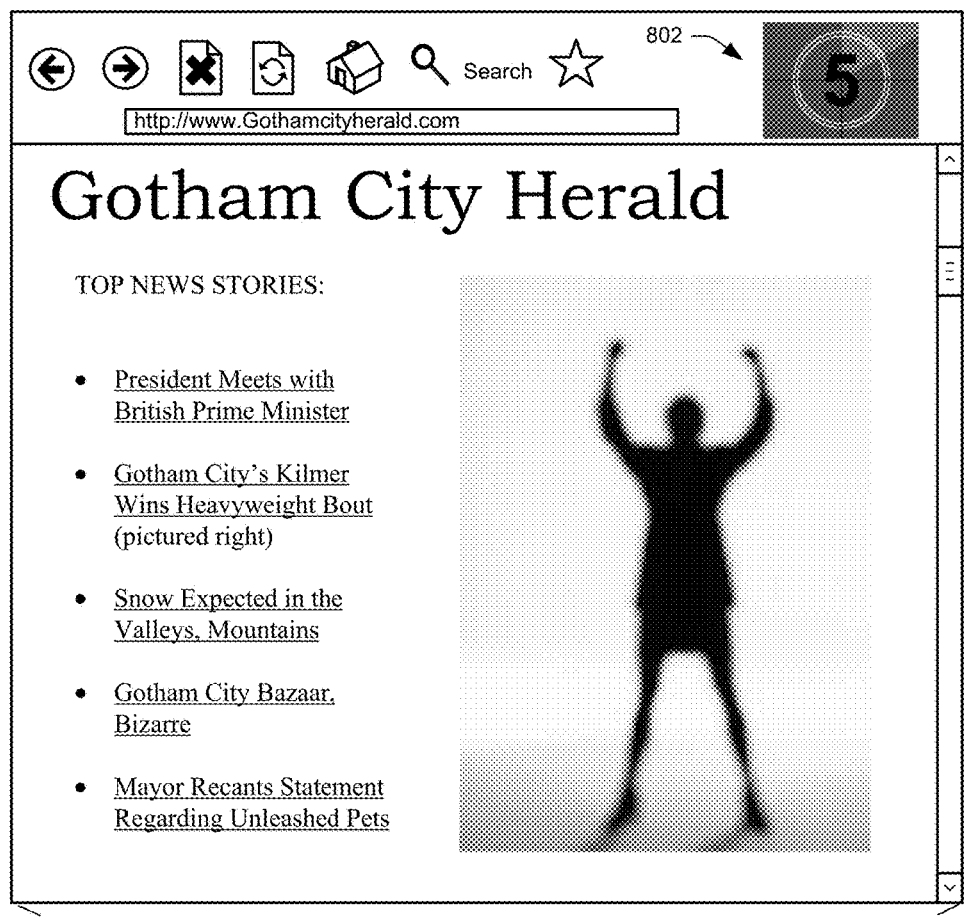
FIG. 8 illustrates another user interface of a web page being displayed by the browser. Here, the user-awareness module detects that an application running within the browser is requesting to access a data stream captured by a passive, privacy-sensitive device of the computing device. In response, the user-awareness module blocks the access and displays a graphical icon that counts down until the module will grant the requested access to the application, absent the user's instructions to the contrary.
Figure 8:
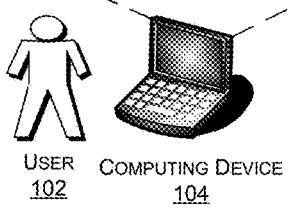

FIG. 8, for instance, illustrates another user interface of a web page being displayed by the browser of the computing device 104. Here, the user-awareness module 126 detects that an application also running within the browser is requesting to access a data stream captured by a passive, privacy-sensitive device of the computing device 104, such as the camera 118 or the like. In response, the user-awareness module 126 blocks the access and displays a graphical icon 802 that counts down until the module will grant the requested access to the application, absent the user's contrary instructions. For instance, if the user 102 does not object by selecting the icon before the countdown reaches zero, then the user-awareness module 126 will grant access to the application running within the illustrated window.

In some instances, the module 126 implements the countdown icon of FIG. 8 if the user 102 closed the application window and then re-opened (or navigated back to) the window, or if the application was sent behind other windows and then restored to the foreground. In each of these instances, the user-awareness module 126 may display a film-style countdown before re-granting the application access to the data stream.

General Operation

Figure 9:
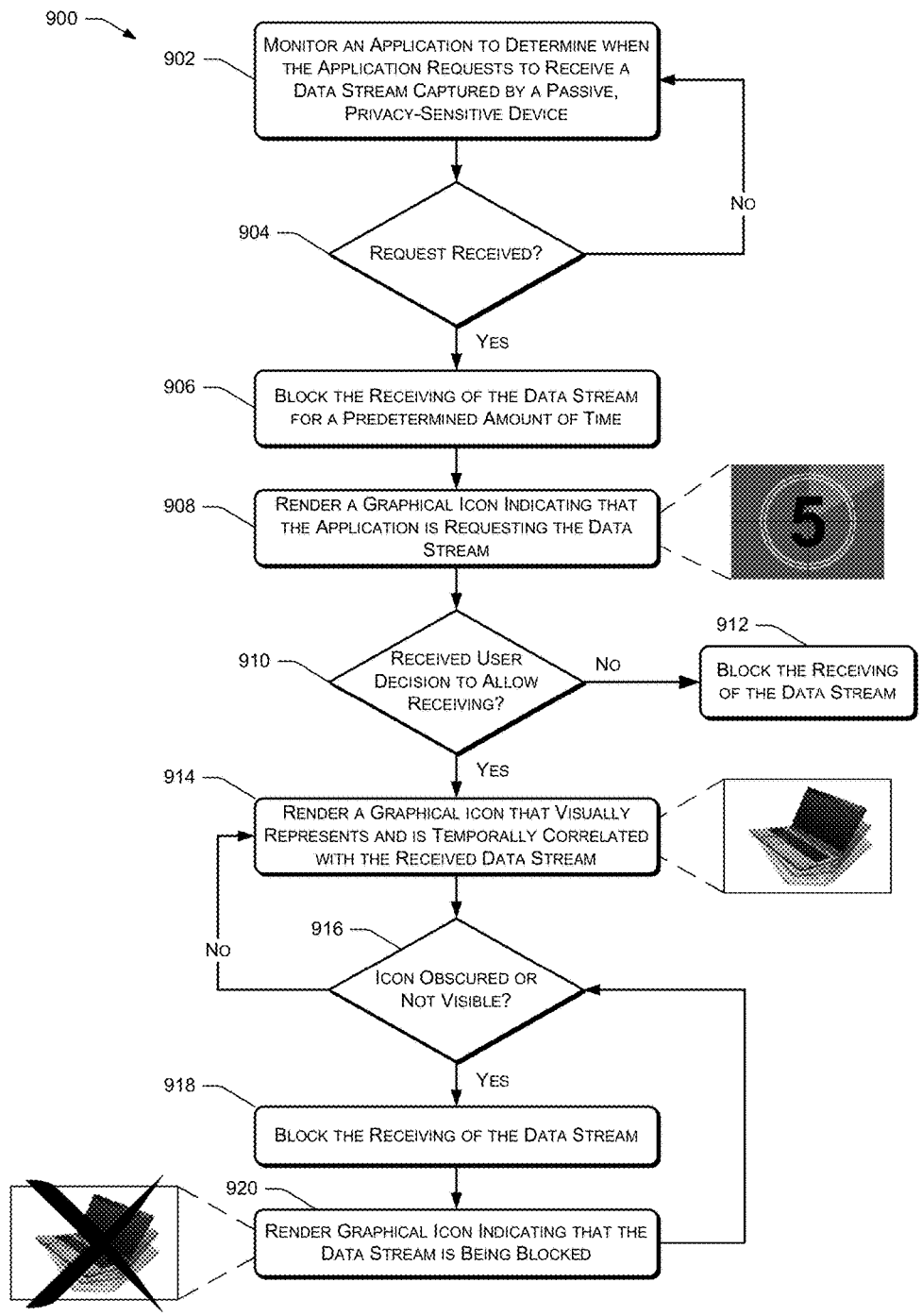
FIG. 9 is a flow diagram of an example process for apprising a user of instances when an application requests a data stream from passive, privacy-sensitive device.

FIG. 9 is a flow diagram of an example process 900 for apprising a user of applications that request data streams from passive, privacy-sensitive devices. This process is illustrated as a collection of blocks in a logical flow graph, which represents a sequence of operations that can be implemented in hardware, software, or a combination thereof. In the context of software, the blocks represent computer-executable instructions stored on one or more computer-readable storage media that, when executed by one or more processors, perform the recited operations. Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein. Furthermore, while this process is described with reference to the architecture 100 of FIG. 1, other architectures may implement this process in whole or in part.

FIG. 9 includes monitoring, by the user-awareness module and at 902, an application (e.g., a web application or otherwise) to determine when the application requests to receive a data stream captured by a passive, privacy-sensitive device of a computing device. At 904, the module 126 queries whether such a request has been received. If not, then process 900 loops back to the monitoring of 902. If so, then the module 126 blocks the receiving of the requested data stream by the application for a predetermined amount of time at 906. For instance, the module may block the receiving of the data stream for five seconds, ten seconds, ten minutes, or the like.

At 908, the user-awareness module 126 displays a graphical icon indicating that the application is requesting access to a data stream captured by a passive, privacy-sensitive device of the computing device. The module 126 may display this icon for a portion or the entire predetermined amount of time during which the module 126 blocks the application's receiving of the requested data stream. This icon may be the icon 802 of FIG. 8, or any other similar or different icon. At 910, the module 126 queries whether or not a decision has been received from the user to allow the application to receive the data stream. This decision may either by an active decision in a default-off model (where the user actively chooses to enable the receiving), or a passive decision in a default-on model (where the user does not actively stop the receiving from occurring). In either instance, if the user chooses not to share the data stream, then the module 126 blocks the reception of the data stream by the application at 912.

If, however, the module 126 does receive a user decision to allow the reception of the data steam by the application, then the module 126 obliges, while displaying a graphical icon indicating the application's receiving of the data stream at 914. As discussed above, this icon may both visually represent the underlying data being received and may also be temporally correlated to the underlying data (e.g., may comprise a live video feed, a representation of captured audio, etc.).

At 916, the user-awareness module 126 queries whether the displayed graphical icon is obscured or otherwise not visible to a user. If not, then the module 126 continues to display the graphical icon until such time as the user closes the application or the application stops receiving the data stream (as initiated by the user or otherwise). If, however, the module 126 does determine that the icon is obscured, then the module 126 blocks the application's receiving of the data at 918. Finally, at operation 920, the module 126 displays a graphical icon indicating the application is being blocked from receiving the data stream. The process 900 then continues to query, at 916, whether the icon remains obscured. When the icon is no longer obscured, then process 900 again allows the application to receive the data stream and displays the icon indicating as much at 914.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method comprising:
   under control of one or more processors of a computing device:
   detecting when an application displaying content within a window on a display of the computing device begins receiving a data stream captured by a camera, a microphone, a location sensor or an accelerometer of the computing device;
   determining if a request submitted by the application to access the data stream captured by the camera, the microphone, the location sensor or the accelerometer of the computing device has been granted by determining whether a module of the computing device is in one of a default-on mode and a default-off mode, wherein the application is determined to have granted the request in response to determining that the module is in the default-on mode, and wherein the application is determined to have granted the request in response to determining that the module is in the default-off mode and when authorization is received to allow the application to access the data stream; and
   in response to detecting that the application has begun receiving the data stream and in response to the determining that the application request has been granted, causing display of a graphical icon on or adjacent to the window of the application on the display, the displayed graphical icon dynamically altering in appearance based on data of the data stream to visually represent the data stream being received by the application, and the displayed graphical icon includes dynamic animations that visually dynamically alter in unison with the data of the data stream.

2. The method of claim 1, wherein the graphical icon comprises a thumbnail of actual live video feed being received by the application.

3. The method of claim 1, wherein the graphical icon comprises a waveform graph, a Volume Units meter, and/or an amplitude graph that dynamically alters with volume of sounds being received in the data stream.

4. The method of claim 1, wherein the application receives the data stream from the accelerometer of the computing device and the graphical icon illustrates the computing device changing its position or orientation.

5. The method of claim 1, wherein the application receives the data stream from the accelerometer of the computing device and the graphical icon illustrates a mode of transportation of a user associated with the computing device.

6. The method of claim 5, wherein the data stream from the accelerometer of the computing device is compared to a data stream from an accelerometer of a second computing device to determine if the computing device and the second computing device share similar modes of transportation.

7. The method of claim 1, wherein the application receives the data stream from the location sensor of the computing device and the graphical icon includes an indication of a current location of the computing device.

8. The method of claim 1, wherein causing display of the graphical icon on the display comprises causing display of the graphical icon on a trusted boarder of the window.

9. The method of claim 1, wherein the graphical indication comprises an indication of an identity of the application that is receiving the data stream.

10. The method of claim 1, wherein the application comprises a video conferencing application, a video chat application, a game, a word processing application or an application that runs within a web browser.

11. The method of claim 1, wherein the application begins receiving the data stream without active input provided by a user.

12. A computing device, comprising:
   one or more processors;
   a display communicatively coupled to the one or more processors and configured to display content; and memory communicatively coupled to the one or more processors, the memory storing instructions that, when executed, configure the one or more processors to perform operations, comprising:

monitoring an application to determine when the application requests to receive a data stream captured by a passive, privacy-sensitive device;

detecting that the application has requested to receive the data stream captured by the passive, privacy-sensitive device;

provisionally blocking the receiving of the data stream for a predetermined amount of time;

determining if a request submitted by the application to access the data stream captured by the passive, privacy-sensitive device has been granted by determining whether a module of the computing device is in one of a default-on mode and a default-off mode, wherein the application is determined to have granted the request in response to determining that the module is in the default-on mode, and wherein the application is determined to have granted the request in response to determining that the module is in the default-off mode and when authorization is received to allow the application to access the data stream; and displaying, on the display in response to the determining that the application request has been granted, a graphical icon indicating that the application is requesting to receive the data stream, the graphical icon indicating that the receiving of the data stream has been provisionally blocked, and the graphical icon includes an animation based on a remaining time of the predetermined amount of time that the receiving of the data stream is provisionally blocked.

13. The computing device of claim 12, wherein the graphical icon comprises a countdown until passage of the predetermined amount of time.

14. The computing device of claim 12, the operations further comprising:

determining that the user did not respond to the request by the application within the predetermined amount of time; and in response to determining that the user did not response within the predetermined amount of time, allowing the application to receive the data stream.

15. The computing device of claim 12, the operations further comprising:

determining that the user did not respond to the request by the application within the predetermined amount of time; and in response to determining that the user did not response within the predetermined amount of time, disallowing the application to receive the data stream.

16. The computing device of claim 12, the operations further comprising:

determining that the monitored application has previously had a request to receive a captured data stream allowed; and in response to determining that the monitored application has previously had a request allowed, allowing the application to receive the data stream.

17. One or more computer memories storing computer-executable instructions that, when executed, cause one or more processors to perform acts comprising:

monitoring an application, that runs on a computing device and that displays a user interface, to determine if a request submitted by the application to access a data stream captured by a passive, privacy-sensitive device of the computing device has been granted;

determining that the application request has been granted by determining whether a module of the computing device is in one of a default-on mode and a default-off mode, wherein the application is determined to have granted the request in response to determining that the module is in the default-on mode, and wherein the application is determined to have granted the request in response to determining that the module is in the default-off mode and when authorization is received to allow the application to access the data stream;

causing, in response to the determining that the application request has been granted, display of a graphical icon within or adjacent to a user interface of the application, the graphical icon visually dynamically altering in unison with the data stream captured by the passive, privacy sensitive device of the computing device.

18. The one or more computer memories of claim 17, wherein determining that the application request has been granted by determining whether the module of the computing device is in one of the default-on mode and the default-off mode comprises:

determining that the module of the computing device is in the default-on mode; and granting the request in response to determining that the module is in the default-on mode.

19. The one or more computer memories of claim 17, wherein determining that the application request has been granted by determining whether the module of the computing device is in one of the default-on mode and the default-off mode comprises:

determining that the module of the computing device is in the default-off mode;

presenting the request submitted by the application to access the data stream on a display of the computing device in response to determining that the module is in the default-off mode; and in response to receiving authorization, allowing the application to access the data stream, granting the request.

20. The one or more computer memories of claim 17, wherein the graphical icon visually depicts the contents of the data stream being captured by the passive, privacy sensitive device of the computing device.

\* \* \* \* \*